C. W. Cahoon.

Lamp.

No. 1,735.

Reissued Aug 9 1864

Witnesses.

Antoyne Anderson Jr.
W. L. Bennum

Inventor.

C. W. Cahoon
by his attorney
C. S. Pomeroy

UNITED STATES PATENT OFFICE.

CHARLES W. CAHOON, OF PORTLAND, MAINE, ASSIGNOR, BY MESNE ASSIGNMENTS, TO CAHOON MANUFACTURING COMPANY.

IMPROVEMENT IN LAMPS.

Specification forming part of Letters Patent No. 31,511, dated February 19, 1861; Reissue No. 1,735, dated August 9, 1864.

*To all whom it may concern:*

Be it known that I, CHARLES W. CAHOON, of Portland, in the county of Cumberland and State of Maine, have invented certain new and useful Improvements in Lamps; and I do hereby declare that the following is a full, clear, and exact description of the same, reference being had to the accompanying drawings, in which—

Figure 1:
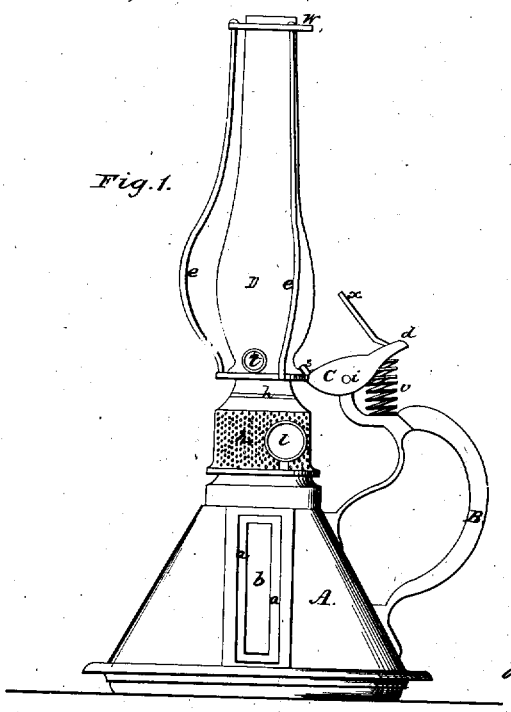
Figure 2:
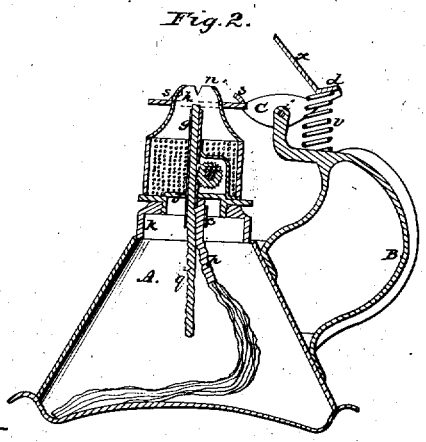
Figure 4:
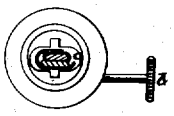
Figure 3:
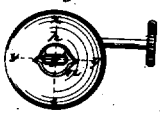
Figure 5:
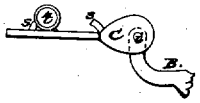

Figure 1 represents a side elevation of a hand-lamp embodying all my improvements. Fig. 2 represents a vertical section of the same. Fig. 3 represents a top view of the burner of the lamp, and Fig. 4 a view of the same reversed. Fig. 5 represents a side elevation of certain parts of the lamp disconnected from the remainder.

A small lamp which would burn the oils that are rich in carbon—such, for example, as kerosene—with success, so as to produce a small quantity of light with economy, and that would be of such light weight and small bulk that it could be readily carried about as a hand-lamp, and would at the same time burn the oil completely or without smoking, and could be conveniently used for lighting other lamps, has long been a desideratum; but, so far as I am aware of, no lamp possessing these qualities was produced prior to my invention. Hence it was customary to use candles, small oil-lamps, and hand-lamps burning explosive burning-fluid where a small quantity of light was wanted, or the light was to be carried about by the hand or to be used in lighting other lamps, although it was well known that such means of producing light are much less economical in proportion to the quantity of light given out by them than the large kerosene-lamps. The lamp which I am about to describe possesses the above-stated desirable qualities and embodies my invention, which consists in certain new combinations of the elementary constituents of lamps.

A kerosene-lamp is usually constructed to use an independent glass chimney, which induces a sufficient draft of air to burn the liquid without smoke, and at the same time permits the light to shine in all directions from the flame. In order that such a lamp may be used to light other lamps, the glass chimney must be removed from over the wick-tube, so as to leave the flame naked.

The object of the first part of my invention is to permit this operation to be effected without disconnecting the glass chimney from its support; and it consists of the combination of a chimney-holder and clamp chimney-fastenings (to secure the glass chimney to said holder) with the support for the chimney-holder by means of a horizontal joint, the whole operating in such manner that a glass chimney can be used and can be removed in an upward direction from over the wick-tube and replaced without the necessity of disconnecting it from the lamp to which it is applied, and also that the falling of the glass chimney from its holder (when removed from over the wick-tube) is effectually prevented.

The object of the second part of my invention is to enable the glass chimney to be manipulated by the hand which carries the lamp; and it consists of the combination of the first part of my invention with a thumb-plate, to which the thumb of the hand which carries the lamp may be applied to effect the removal of the glass chimney from over the wick-tube without the disconnection of the glass chimney from the lamp.

The object of the third part of my invention is to prevent the accidental contact of the thumb with the hot chimney when removing the latter, whereby a bad burn would be produced. This part of my invention consists of the combination of the second part of my invention with a guard located between the position of the thumb and the fastenings for the chimney.

The object of the fourth part of my invention is to hold the chimney in its place over the wick-tube when the lamp is being carried about by hand. This part of my invention consists of the combination of a spring with the first part of my invention in such manner that the spring holds the chimney-holder upon the burner of the lamp or its equivalent.

The object of the fifth part of my invention is to protect the chimney from injury by collision with other objects without interfering with the ready removal of it from over the wick-tube and its replacement. This part of my invention consists of the combination of a chimney-guard with the first part of my invention so that the chimney-guard, chimney, and chimney-holder maintain their proper relations in all positions of the chimney. It is well known that a lamp-body wholly of glass is objectionable on account of its fragility, unless it be made of great thickness, and such a thick glass body is objectionable on account of its weight and cost. On the other hand, a lamp body wholly of metal, although free from the defects of a glass body, is opaque, and does not permit the user to see the level of the oil within it.

The object of the sixth part of my invention is to enable the user to see when a lamp made of opaque material, such as metal, requires to be filled, without the necessity of unscrewing or removing any portion thereof to permit the user to look into the lamp. This part of my invention consists of the combination of a transparent plate with a metal lamp-body, so that the combined strength and lightness of metal may be made available for the construction of the greater portion of the body of a lamp without preventing the user from seeing the level of the oil, and that the glass used may be reduced to so small a breadth that it may be made strong enough to resist all ordinary accidents without any material increase in the weight or cost of the lamp.

All the parts of my invention are embodied in the hand-lamp represented in the annexed drawings, and I believe that the best hand-lamp will be obtained by such a use of my invention, although parts of it may be used without the remaining part, as constructors of lamps may deem expedient.

The body A of the hand-lamp represented in the drawings is made mainly of tin plate, with a glass plate, *b*, inserted in its side. This glass plate is held in place by a frame-work of tin plate, which is soldered to the body and whose lips *a a* lap over the edges of the glass plate. The joint is made tight by means of cement, which, when kerosene or oil is burned, may be made of shellac and alcohol. The lamp-body has a handle, B, secured to one side in a convenient position to be grasped by the hand of the user when the lamp is to be moved. The body of the lamp is surmounted by the burner, which consists of the wick-holder *g* and the deflector or air-cone *h*, by which air is guided against the flame. The wick holder or tube *g* is secured in a plate, *j*, which is screwed into a tubular head or collar, *k*, that is made fast to the body of the lamp, so that the burner can be removed for the purpose of filling the lamp with oil or supplying a new wick. The wick-holder is flat and narrow, or, in other words, of small breadth, so as to hold a narrow, flat wick, and it is fitted with a toothed spindle or barrel, *m*, having a stem and milled head, *l*, by turning which the wick may be raised or depressed. The tube-plate *j* supports the cone *h*, which surrounds the wick-tube, and is perforated at its sides to admit air, thus forming a perforated air-screen. The upper end of this cone is contracted so as to form a circular opening, *n*, that is at a short distance above the upper end of the wick-tube, and forms the orifice through which the flame issues. The parts of this circular orifice which are opposite the narrow sides of the wick-tube are notched, as shown in the drawings, the practical effect of which is to cause the flame to spread laterally.

The lamp represented in the drawings is fitted with a supplementary wick-holder for the purpose of holding a supplementary wick. The supplementary wick-holder is located in this instance wholly beneath the tube-plate *j*, and consists of a spring-plate, *c*, which holds the upper end of the supplementary wick *p* in contact with the burning wick *q*. The side of the wick-tube adjacent to the supplementary wick-holder is removed, so that no obstacle intervenes between the two wicks; hence the liquid drawn up by the supplementary wick is transferred by capillary attraction to the burning wick when the latter is too short to reach down into the oil and draw its own supply. The burner is surmounted by the chimney-holder C, to which the clamp chimney-fastenings *s s t* are secured. The chimney-holder has the form of a broad ring, which fits upon and is sustained by the air-cone *h*. The clamp-fastenings are so formed that they overlap the lip at the lower edge of the glass chimney D, so as to secure it to the chimney-holder, and prevent it from dropping therefrom even if the holder be tipped far enough to make the upper end of the chimney point downward. The chimney-holder and clamp chimney-fastenings are combined with the handle B (which in the lamp represented is the support of the chimney-holder) by means of a horizontal joint-pivot, *i*, so that the chimney-holder, with its clamp-fastenings, can be tipped to remove the chimney in an upward direction from over the wick-tube; hence the combination described, which is represented at Fig. 5 as disconnected from the other parts of the lamp, permits the employment of an independent glass chimney, permits it to be removed from over the wick-tube and replaced without the necessity of disconnecting it from the lamp, and secures it to its holder, so that the chance of its dropping therefrom when tipped is effectually prevented.

In order that the removal of the glass chimney may be conveniently effected by the hand which carries the lamp, the chimney-holder is constructed with a thumb-plate, *d*, which is in a convenient position to receive the thumb or the hand which holds the lamp by the handle. In order to maintain the chimney in its position when the lamp is carried about by the hand, the chimney-holder C, to which the chimney is fastened, is held over the burner by a spring, *v*, located between the thumb-plate *d* and the handle; and in order to prevent the accidental burning of the thumb of the user by contact with the highly heated chimney, a guard-plate, *x*, is combined with the thumb-plate and its connections at a point intermediate between the thumb-plate *d* and the chimney D. The combination of the chimney-guard with the chimney-holder and its connections permits it to maintain its proper relation to the chimney in whatever position the latter be placed, thus enabling a chimney-guard to be used upon a small lamp adapted to lighting other lamps.

Having thus described a hand-lamp embodying all my improvements, I deem it proper to state that parts thereof may be modified without changing the principle of my invention. Thus, for example, the precise form of the orifice of the air-deflector may be varied, and it may even be rectangular; but I have found by experiment that when a narrow, flat wick is used, such as is shown in the drawings, the width of the orifice of the deflector, measured in a direction crosswise to the breadth of the flat wick, or, in other words, in the direction of the line *z z* of Fig. 3, should be about as great as the breadth of the wick-tube measured in the direction of the line *y y* of Fig. 3, or even still greater than the breadth of the flat wick-tube when a still narrower wick than that represented in the drawings is used, in order to prevent the draft of air from extinguishing the light when the wick is being turned down (after lighting the lamp) to its proper position for burning, and in order also that the flame may extend up through the orifice when the chimney is withdrawn.

I have also constructed the chimney-holder with a thumb-plate, so that the movement can be conveniently effected by the thumb of the user; but it is evident that it may be operated by one of the fingers of the user, and may be modified to adapt it to such operation.

The lamp represented in the drawings is adapted to burning pure kerosene-oil which has not been affected by long exposure to the air. It is well known among dealers that oil which has been so exposed is not as good as that which has been kept from contact with the air, and is liable to smoke when burning.

Having thus described a lamp embodying my improvements in the best form known to me at the date of my application for my original patent, I declare that I do not claim to be the first inventor of any one of the separate elements which are combined to make my new combinations; nor do I claim to have been the first who combined a chimney with a lamp by means of a link so that it could be moved from over the wick-tube without detachment from the lamp, as I am aware that a metal chimney has been soldered fast to a link which was hinged to a lamp, so that the chimney, although removable from over the wick-tube, was not independent of the lamp. My invention has special reference to lamps adapted to the use of loose glass chimneys, which are independent appendages to a lamp, and constitute a distinct manufacture.

I therefore claim as my invention and desire to secure by Letters Patent—

1. The combination of the chimney-holder and clamp chimney-fastenings of a lamp with the support of the chimney-holder by a horizontal joint, the combination as a whole operating substantially as set forth.

2. The combination of the chimney-holder, chimney-fastenings, support for the chimney, joint, and thumb-plate, the whole operating substantially as set forth.

3. The combination of the preceding combination with a guard, arranged substantially as set forth.

4. The combination of a spring with the chimney-holder, chimney-fastenings, support for the chimney, and joint, the whole operating substantially as set forth.

5. The combination of a chimney-guard with the chimney-holder, chimney-fastenings, support for the chimney, and joint, the whole operating substantially as set forth.

6. The combination of a transparent plate with an opaque metal lamp-body, substantially as set forth.

In testimony whereof I have hereto subscribed my name.

CHAS. W. CAHOON.

Witnesses:
JOHN HERSY DOTEN,
T. H. MORRISON.